Jan. 7, 1947.  H. S. MILLER  2,413,773
PRODUCTION OF ACRYLIC NITRILE
Filed April 27, 1944
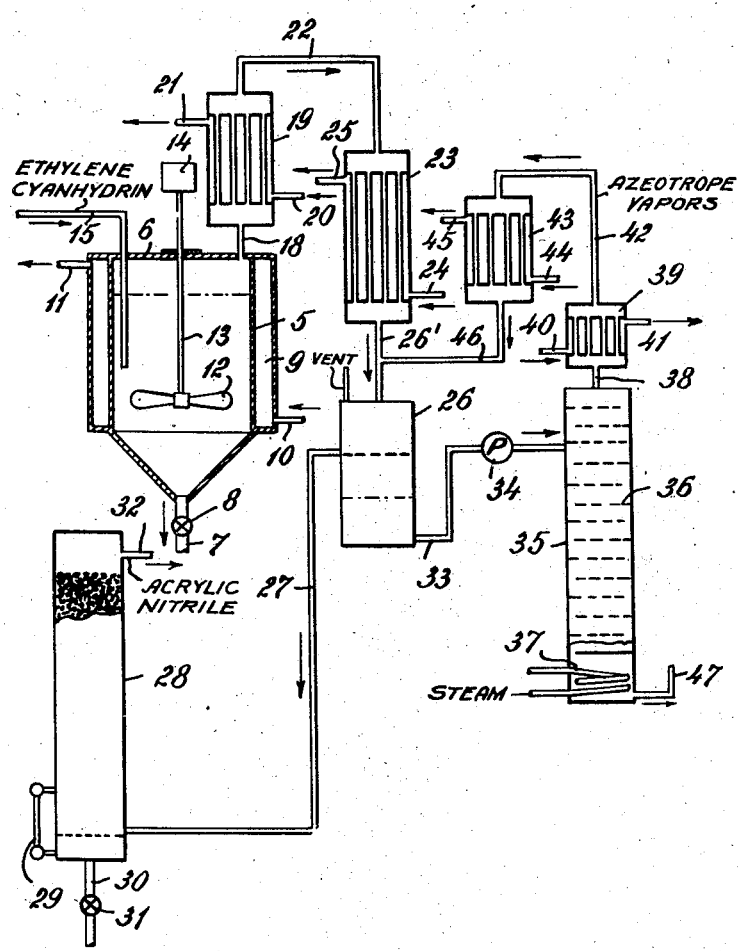
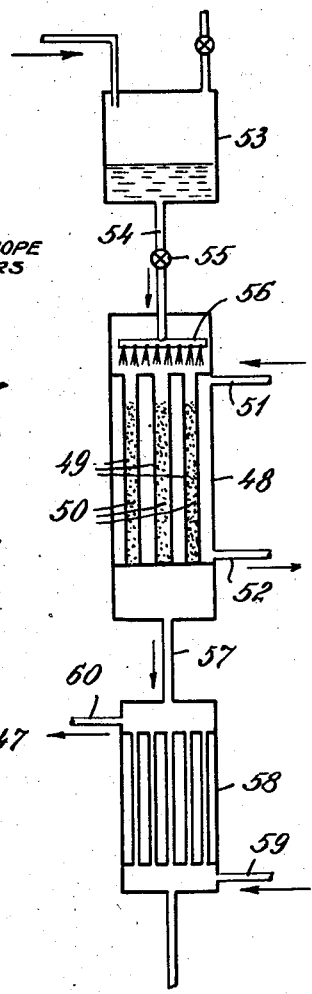
INVENTOR.
Hoke S. Miller
BY
ATTORNEYS Patented Jan. 7, 1947

2,413,773

UNITED STATES PATENT OFFICE 2,413,773

PRODUCTION OF ACRYLIC NITRILE

Hoke S. Miller, Stamford, Conn., assignor to Air Reduction Company, Incorporated, New York, N. Y., a corporation of New York Application April 27, 1944, Serial No. 532,941

9 Claims. (Cl. 260—464)

This invention relates to the production of acrylic nitrile (also as vinyl cyanide) by dehydration of ethylene cyanohydrin.

It has been suggested previously that acrylic nitrile may be produced by the dehydration of ethylene cyanohydrin, but the procedure as known is a batch operation and subject to numerous disadvantages in so far as practical commercial application of the reaction is concerned. It has not been possible heretofore to conduct the reaction in a continuous manner and on an efficient and economical basis.

It is the object of the present invention to provide a simple and practicable procedure whereby ethylene cyanohydrin may be converted in a continuous manner by dehydration to produce acrylic nitrile in a commercially acceptable form.

Other objects and advantages of the invention will be apparent as it is better understood by reference to the following specification and the accompanying drawing, in which Fig. 1 illustrates diagrammatically an apparatus suitable for the practice of the invention; and Fig. 2 shows a modification of such apparatus.

I have discovered that ethylene cyanohydrin may be dehydrated successfully and effectively in the presence of a catalyst derived from clays variously termed "bentonite," "montmorillonite," etc., but more properly classified as "smectites." When such clays are treated with hot dilute acid, usually sulphuric acid of about 25% concentration, certain soluble constituents are removed. The material may be subjected to heat treatment in the presence of acid at temperatures of about 275° F. or even up to 750° F. The excess acid and soluble salts are separated by a suitable water wash. The resulting product is a clay having greatly increased adsorptive capacity which has been used heretofore for decolorizing animal and vegetable oils, sugar syrups, fats, waxes and the like.

The methods of treating such clays and the products are well known in the art. The methods are described in the patents to Baylis Nos. 1,776,990, 1,792,625, 1,818,453 and 1,819,496 and in various other patents including the patent to Belden et al., No. 1,980,569. The product has been marketed under the trade names of "Filtrol" and "Super Filtrol."

An aqueous extract obtained by shaking 50 grams of activated clays of the type described with 100 cc. of distilled water at room temperature had a pH determined by a glass electrode varying from 3.03 to 6.80. The composition and pH may vary considerably. While I do not wish to be restricted to any theory, I believe that the value of such activated clays for the purpose of the present invention depends upon their physical conformation rather than the precise chemical composition.

As catalysts, the activated clays are used preferably in finely divided form in liquid phase dehydration or in the form of irregular pieces of suitable size for vapor phase dehydration. In the latter case, the clays may be formed into suitable shapes by extrusion, pelleting and the like. I have found that short rods or pellets about one-eighth inch in diameter and one-quarter inch long give excellent results in vapor phase dehydration. The activated clays whether pelleted or not, have good mechanical strength and are well adapted for use in the usual types of catalytic reactors.

The procedure for liquid phase dehydration will be readily understood by reference to Fig. 1 of the drawing, which is merely illustrative of suitable equipment for the purpose. The reactor 5 is a receptacle having a closure 6 and an outlet 7 controlled by a valve 8. A heating jacket 9 is adapted to be supplied through a pipe 10 with a suitable heating liquid which escapes through a pipe 11 and is reheated for circulation through the jacket. Any suitable heating liquid adapted to be maintained at the desired temperature may be employed. "Dowtherm" (a mixture of diphenyl and diphenyl oxide) is well adapted for the purpose, since it may be readily maintained at the desired temperature to heat the body of liquid within the reactor 5. An agitator 12 is mounted on a shaft 13 and is adapted to be driven from any suitable source such as a motor 14 to maintain the desired agitation during the reaction.

The reactor 5 is partially filled with ethylene cyanohydrin with the catalyst hereinbefore described in finely divided form suspended therein. Additional ethylene cyanohydrin is introduced through a pipe 15 from any suitable source of supply at substantially the rate of reaction. The ethylene cyanohydrin enters beneath the surface of the body of liquid in the reactor and immediately is raised to the temperature thereof while it is brought into contact with the catalyst. As a result, acrylic nitrile is produced and escapes, together with water vapor formed as the result of the reaction and some unreacted ethylene cyanohydrin, through a pipe 18. The vapors pass to a reflux condenser 19 which is maintained at a temperature such as to condense the bulk of the unreacted ethylene cyanohydrin by cooling water circulated through pipes 20 and 21. The unreacted ethylene cyanohydrin is delivered by the pipe 18 to the reactor.

The remaining vapors escape through a pipe 22 to a condenser 23 supplied with cooling water which circulates through pipes 24 and 25. The condensate, consisting principally of acrylic nitrile, some water and some unreacted ethylene cyanohydrin is delivered by a pipe 26' to a collector 26. In the collector 26, the condensate separates into two layers, the upper of which consists of acrylic nitrile containing some water. This layer is withdrawn through a pipe 27 and is delivered to suitable dehydration equipment such for example as a tower 28 packed with any suitable dehydrating agent such as calcium chloride. The tower 28 is provided with a sight glass 29 near its bottom, and the water accumulating therein may be withdrawn from time to time through a pipe 30 provided with a valve 31. The dry acrylic nitrile is withdrawn through a pipe 32 at the top of the tower.

Any other suitable drying equipment such as a fractionating column equipped with a reflux condenser, total condenser and separator may be substituted for the tower 28. In such equipment, water is removed from the acrylic nitrile as a binary azeotrope boiling at about 70° C. The azeotrope is condensed and separated, the water layer being discarded and the acrylic nitrile layer returned with the fresh feed. The dried acrylic nitrile is removed from the bottom of the fractionating column. In either case, the dried acrylic nitrile may be distilled, if desired, but ordinarily it is sufficiently pure for subsequent use in synthesis operations.

The lower layer in the separator 26 consists of water containing some acrylic nitrile and ethylene cyanohydrin. It is delivered by a pipe 33 and pump 34 to a fractionating column 35 provided with trays 36 or other means to facilitate contact between liquid and vapors in the column. The bottom of the column is heated by steam introduced through a coil 37. Vapors rising through the column are delivered by a pipe 38 to a condenser 39 which is maintained by water circulating through the pipes 40 and 41 at a temperature of approximately 70° C., which is the boiling point of the binary azeotrope of acrylic nitrile and water. Products in the vapors having higher boiling points are returned to the column. The azeotrope vapors are delivered by a pipe 42 to a condenser 43 cooled by water circulating through pipes 44 and 45 and the condensate is returned by a pipe 46 to the separator 26. Thus all of the acrylic nitrile is recovered.

The liquid consisting of water containing possibly some ethylene cyanohydrin is withdrawn from the column 35 through a pipe 47. It may be discarded or if desired treated by fractionation in any suitable manner to recover ethylene cyanohydrin which may be returned to the reactor.

The procedure as described permits the continuous conversion of ethylene cyanohydrin, a liquid boiling at 221° C., to acrylic nitrile boiling at about 78° C., and substantially avoids losses, since unconverted ethylene cyanohydrin may be recovered and returned for further treatment with the catalyst and the acrylic nitrile is recovered completely and substantially free from water.

To operate in the vapor phase, the apparatus is modified by substituting for the reactor 5 a reactor 48 having tubes 49 in which the catalyst 50 is disposed in the form of lumps, pellets or the like. The heating agent, as previously described, is introduced through a pipe 51 and withdrawn through a pipe 52 to maintain the desired temperature. Ethylene cyanohydrin is delivered from a receptacle 53 through a pipe 54 controlled by a valve 55 to a head 56 which sprays the material into the tubes 49 where it is immediately vaporized in contact with the catalyst. The vapors escape through a pipe 57 to a condenser 58 cooled by water supplied through a pipe 59 and withdrawn through the pipe 60. The condenser 58 corresponds to the condenser 23 in the apparatus shown in Fig. 1. The remaining equipment and procedure are substantially identical, that is, the vapors are initially condensed and separated into layers, the upper layer is subjected to drying to remove water from the acrylic nitrile, and the lower layer is subjected to fractionation to produce the azeotrope of acrylic nitrile and water which is returned to the collector. The vapor phase procedure accomplishes the same result with respect to the conversion of ethylene cyanohydrin to acrylic nitrile as previously described.

The following examples of the application of the invention in laboratory apparatus will sufficiently illustrate the procedure:

*Example I*

200 parts of ethylene cyanohydrin and 20 parts of 100 mesh "Super Filtrol" were heated in a container equipped with an inlet tube for feeding fresh cyanohydrin and an exit line leading to a fractionating column, condenser and receiver. The contents of the reactor were heated to a range of 150–210° C. Water, acrylic nitrile and some ethylene cyanohydrin were returned to the reactor, the remaining vapor being condensed and collected in the receiver. As the reaction progressed, further amounts of fresh ethylene cyanohydrin were fed to the reactor. The acrylic nitrile collecting in the receiver was measured and analyzed. 85% of the ethylene cyanohydrin entering the reactor was converted to acrylic nitrile.

*Example II*

About 100 cc. of one-eighth by one-quarter inch "Filtrol" pellets were placed in an electrically heated silica tube of approximately seven-eighths inch diameter and thirty-six inch length. Suitable connections permitted the feeding of ethylene cyanohydrin to the top of the vertically placed reactor, and the flow of vapor from the bottom of the reactor to a condenser and receiver. Maintaining the reactor at 300–328° C., and feeding 18.6 grams of ethylene cyanohydrin per hour, acrylic nitrile was produced at a conversion and yield of about 59 and 90% respectively.

The procedures as described afford efficient and continuous operation in the conversion of ethylene cyanohydrin to acrylic nitrile. The improved results obtained depend upon the use of the active catalyst as described, which has extended and effective life.

Various changes may be made in the procedure and in the apparatus as described without departing from the invention or sacrificing the advantages thereof.

I claim:

1. The method of producing acrylic nitrile by dehydration of ethylene cyanohydrin which comprises heating the ethylene cyanohydrin in the presence of a catalyst consisting of an acid-activated smectite clay selected from the group consisting of bentonite and montmorillonite clays.

2. The method of producing acrylic nitrile by dehydration of ethylene cyanohydrin which comprises heating liquid ethylene cyanohydrin in the presence of a catalyst consisting of an acid-activated smectite clay selected from the group consisting of bentonite and montmorillonite clays.

3. The method of producing acrylic nitrile by dehydration of ethylene cyanohydrin which comprises heating vapors of ethylene cyanohydrin in the presence of a catalyst consisting of an acid-activated smectite clay selected from the group consisting of bentonite and montmorillonite clays.

4. The method of producing acrylic nitrile by dehydration of ethylene cyanohydrin which comprises heating the ethylene cyanohydrin to a temperature between 150° and 328° C. in the presence of a catalyst consisting of an acid-activated smectite clay selected from the group consisting of bentonite and montmorillonite clays.

5. The method of producing acrylic nitrile by dehydration of ethylene cyanohydrin which comprises heating liquid ethylene cyanohydrin to a temperature between 150° and 210° C. in the presence of a catalyst consisting of an acid-activated smectite clay selected from the group consisting of bentonite and montmorillonite clays.

6. The method of producing acrylic nitrile by dehydration of ethylene cyanohydrin which comprises heating vapors of ethylene cyanohydrin to a temperature between 300° and 328° C. in the presence of a catalyst consisting of an acid-activated smectite clay selected from the group consisting of bentonite and montmorillonite clays.

7. The method of producing acrylic nitrile by dehydration of ethylene cyanohydrin which comprises heating the ethylene cyanohydrin in the presence of a catalyst consisting of a smectite clay selected from the group consisting of bentonite and montmorillonite clays.

8. The method of producing acrylic nitrile by dehydration of ethylene cyanohydrin which comprises heating liquid ethylene cyanohydrin in the presence of a catalyst consisting of a smectite clay selected from the group consisting of bentonite and montmorillonite clays activated by treatment with acid and washing to remove excess acid and soluble salts.

9. The method of producing acrylic nitrile by dehydration of ethylene cyanohydrin which comprises heating vapors of ethylene cyanohydrin in the presence of a catalyst consisting of a smectite clay selected from the group consisting of bentonite and montmorillonite clays activated by treatment with acid and washing to remove excess acid and soluble salts.

HOKE S. MILLER.